G. D. Emerson,
Friction Clutch.

No. 93,604.        Patented Aug. 10, 1869.

Witnesses:
F. A. Davis
Kate N. Jones

George D. Emerson
By J. Fraser & Co.
Att'ys.

UNITED STATES PATENT OFFICE.

GEORGE D. EMERSON, OF CALUMET, MICHIGAN.

IMPROVEMENT IN FRICTION-CLUTCHES.

Specification forming part of Letters Patent No. 93,604, dated August 10, 1869.

*To all whom it may concern:*

Be it known that I, GEORGE D. EMERSON, of Calumet, in the county of Houghton and State of Michigan, have invented a certain new and Improved Friction Device for Engaging and Disengaging Gearing; and I do hereby declare that the following is a full and exact description thereof, reference being had to the accompanying drawings, making part of this specification, in which—

Figure 1:
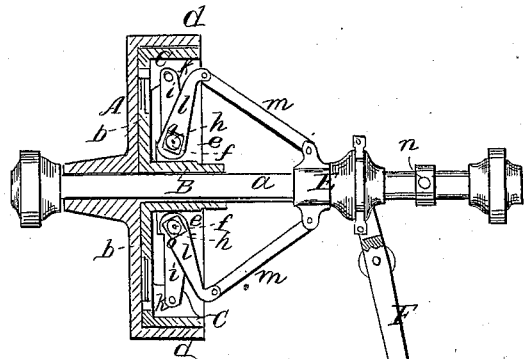
Figure 2:
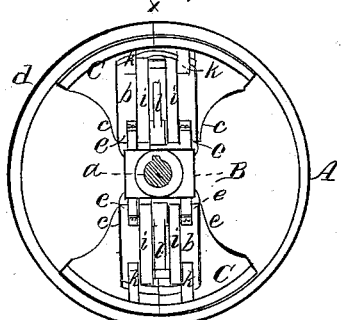
Figure 3:
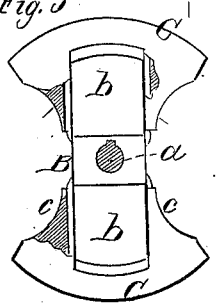
Figure 4:
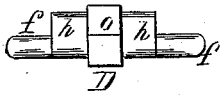

Figure 1 is a section of my improved device in the plane of line $xx$, Fig. 2; Fig. 2, a front view of the device in cross-section of the shaft; Fig. 3, a rear view of the segment bearings or brakes, showing their adjustable connection with the hub; Fig. 4, a view of one of the eccentric bearings removed.

Like letters of reference indicate corresponding parts in all the figures.

My invention consists in the construction and arrangement of the adjustable segmental friction-bearings in relation to the pulley or gear-wheel, the said friction-bearings being adjusted to engage and disengage with the said wheel by the means hereinafter described, consisting of the eccentric bearings and levers, and operated by any suitable appliances that may be most desirable and convenient.

In the accompanying drawings, A indicates the band or gear wheel, which is made of the shell or cup form shown, with one side open, for the insertion of the mechanism. This wheel is loosely mounted on an axle, $a$. Within this wheel, and also secured to the axle $a$, is a hub, B. This hub is provided with webs or bearings $b\ b$, upon which slide the grooved bearings $c\ c$ of the segment friction-bearings C C. These segment-bearings extend out in close proximity with the inside surface of the rim or flange $d$ of the driving wheel or pulley, and are adjusted out and in, to engage and disengage with the wheel A, by the following means:

Bearings $e\ e$ are formed on the hub B, in which rest the bearings $f\ f$ of the eccentric or cam roller D, Fig. 4. On the eccentric portions $h\ h$ of this piece rest the ends of the connecting arms or links $i\ i$, which are also pivoted, at their opposite ends, to the bearings $k\ k$ of the segment-bearings C.

On the central or square portion, $o$, of the eccentric D are firmly secured lever-bars $l\ l$, which are also jointed to the bars $m\ m$, that are attached, at their opposite ends, to the sliding collar E, situated on the shaft $a$.

A lever, F, is employed for adjusting the collar E on the shaft, and a stop, $n$, to limit its backward motion. Thus it will be perceived that by simply adjusting the sliding collar E upon the shaft the eccentric bearings are revolved sufficiently to throw the segmental friction-bearings C out firmly against the inside surface of the rim or flange $d$ of the loose wheel A, and thereby form a rigid connection between it and the shaft $a$.

By the employment of my improved device, I am enabled to dispense entirely with the separate loose and fixed pulleys, when both are used, and thereby the necessity of shifting the belt to change the gearing. The single pulley A serves the double purpose, first, of the loose pulley, when the clamping device is disengaged therefrom and is allowed to revolve freely upon the shaft; and, second, as a fixed pulley, when the parts are rigidly connected by means of the eccentric device and friction-clamps, as above described.

It will be seen that the segment-bearings, when properly adjusted, may be securely fixed in position by means of the lever F, or by any other suitable appliance, to the sliding collar, so that the action of the machinery or the centrifugal force of the segments cannot accidentally form a connection with the loose pulley when disengaged, or loosen their connection therewith when engaged, as the case may be.

My device is very simple and effective, and combines with this durability and strength. The webs $b\ b$, which receive the sliding bearings $c\ c$ of the segments, afford a free and uniform adjustment, and also overcome the lateral strain produced between the segments and pulley in propelling the machinery.

What I claim as my invention is—

The cam-rollers D, consisting of the cylindrical parts *h h*, on which one end of the links *i i* are mounted, the angular parts *o*, to which the levers *l* are secured, and the eccentric journals *f*, in combination with the friction-segments C C, the webs *b b*, and bearings *k k*, to which the other ends of the links *i i* are jointed, when the parts are constructed and operate together substantially as described.

In witness whereof I have hereunto signed my name in the presence of two subscribing witnesses.

GEO. D. EMERSON.

Witnesses:
 I. A. DAVIS,
 KATE N. JONES.